Feb. 14, 1967    C. K. STEDMAN    3,303,693
ARM TYPE FILM BRIDGE WITH MINIMAL THERMAL ZERO SHIFT
Filed March 23, 1964
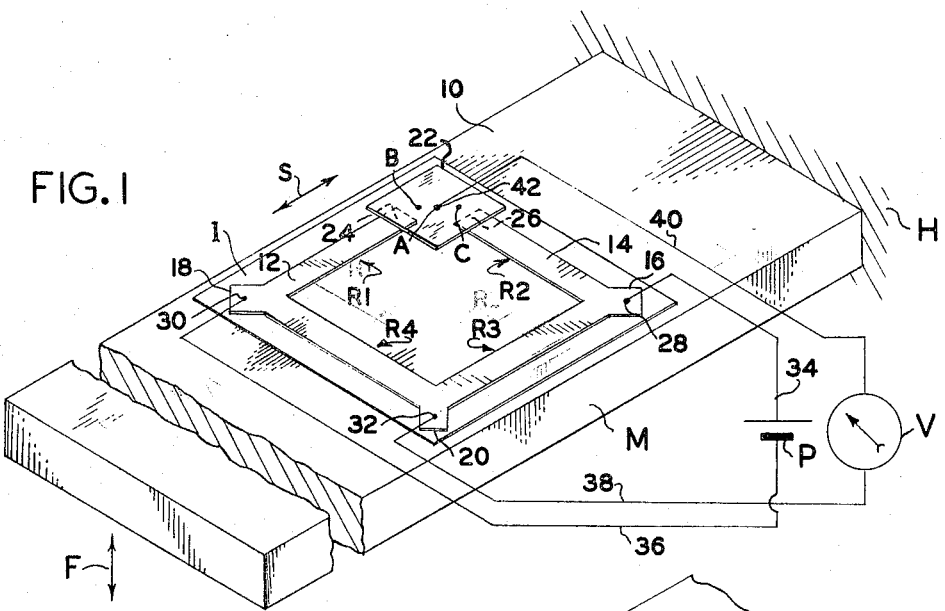
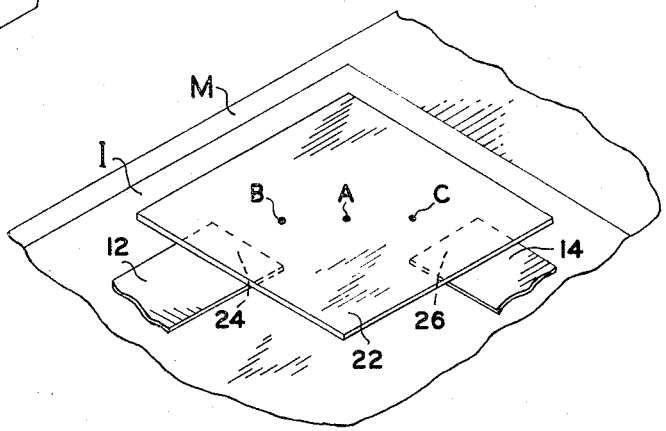
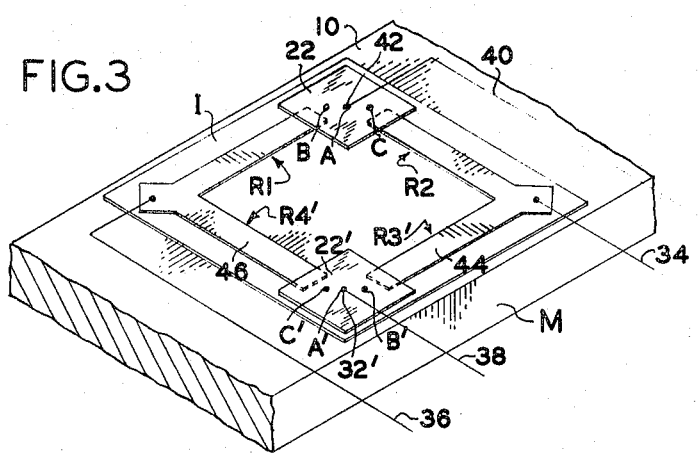
INVENTOR.
CECIL K. STEDMAN
BY *Mathis & Graybeal*
ATTORNEYS

United States Patent Office 3,303,693
Patented Feb. 14, 1967

3,303,693
ARM TYPE FILM BRIDGE WITH MINIMAL THERMAL ZERO SHIFT
Cecil K. Stedman, Enumclaw, Wash., assignor to Statham Instruments, Inc., Los Angeles, Calif., a corporation of California
Filed Mar. 23, 1964, Ser. No. 353,902
10 Claims. (Cl. 73—88.5)

The present invention relates to improvements in strain sensitive bridges of the type wherein the bridge elements or "arms" are in the form of an electroconductive film or the like, and more particularly relates to bridge patterns and bridge element arrangements wherein the thermal zero shift of the bridge output is minimized, i.e. the output voltage of the bridge in the absence of applied stress remains essentially constant over a wide temperature range.

As is well known, plural arm bridge arrangements are employed in strain gages and the like to provide an indication of the amount of stress applied to a flexural base member on which the bridge is mounted. Such bridges are most commonly of the so-called four-arm type, with each end of each arm sharing a terminal with the end of the adjacent arm, the adjacent arms being arranged in respectively different attitudes with respect to the direction of the applied stress, and with an input voltage being applied to one opposed pair of terminals and the other opposed pair of terminals providing an output voltage which is indicative of the strain induced. A two-arm bridge is like a four-arm bridge except that it comprises two strain sensitive arms with a common output terminal, and two resistance elements (usually placed externally of the strain gage) which at their common terminal provide a reference voltage level for comparison with the strain-variable voltage at the other output terminal. In view of the functional similarity of two-arm and four-arm bridges insofar as thermal zero shift is concerned, the following discussion of the invention deals essentially with four-arm bridge configurations, it being considered obvious that the invention is equally applicable to two-arm bridge configurations if desired.

Specifically, and by way of typical example, a known type of four-arm film bridge, and suitable method of fabrication thereof by vacuum electrodeposition techniques, are disclosed in my copending U.S. patent application 307,473, filed September 9, 1963, as at FIG. 4 thereof.

Whether the bridge arms of a four-arm bridge are formed of film, or from individual resistance wires connected between tie points, such bridges are ordinarily considered to comprise resistance elements with nominally equal resistance, so that in the absence of stress the output voltage developed across the opposed output terminals of the bridge is optimally zero. However, with conventional bridge design, and as a result of slight differences arising from such variables as arm dimensions, film constituency, and differential expansion of the supporting structure, the arms of the bridge have slightly different temperature coefficients of resistance so that the bridge output voltage varies somewhat with variation in temperature. Such temperature responsive variation in output voltage is known as "thermal zero shift" or simply "thermal shift," and is so referred to herein. It is the basic object and purpose of the present invention to minimize and for practical purposes eliminate this thermal zero shift.

Certain conventional plural arm type bridge arrangements have separate resistance wires between tie points, with joined tie points to provide common voltage input and voltage output terminals. In this sort of bridge arrangement, the resistance elements are in slightly spaced relation to the flexed base member so do not change temperature at quite the same rate as the flexed base member. In this situation, even though auxiliary resistance elements are introduced or substituted to reduce thermal zero shift at various stabilized temperatures throughout the operating range of the strain gage, the bridge nevertheless exhibits considerable transient thermal zero shift while the operating temperature is changing. It is a further object of the present invention to minimize this transient thermal zero shift with changing temperature, as well as at various stabilized temperatures.

Yet another object of the present invention is to provide a production technique whereby the optimum terminal placement for a bridge to obtain minimal thermal zero shift can be readily and accurately ascertained in the course of a single cycling of the bridge through its intended operating temperature range.

Generally considered, the primary characteristic and feature of the present invention involves the elimination of the thermal zero shift in a plural arm bridge by composing the portion of the bridge in the vicinity of at least one common terminal between bridge arms of an electroconductive film having a substantially different temperature coefficient of resistance than has the electroconductive film making up the remainder of the bridge arms, such common terminal connection being placed at an experimentally determined point providing minimal thermal zero shift.

These and various other objects, features, characteristics and advantages of the present invention will become apparent from the following discussion of certain typical and therefore non-limitive embodiments of the invention taken together with the accompanying drawings, wherein like letters and numerals refer to like parts, and wherein:

FIG. 1 is an isometric, somewhat fragmentary view of a typical four-arm bridge and supporting flexural base member, with the associated input and output connections and Wheatstone bridge circuit components being shown diagrammatically;

FIG. 2 is an enlarged fragmentary view of the portion of the bridge shown in FIG. 1 which has a substantially different temperature coefficient of resistance than has the other portions of the adjacent bridge arms of which it forms a part; and FIG. 3 is an isometric, somewhat fragmentary view similar to the view of FIG. 1, showing a modified form of bridge typifying the invention, wherein the bridge arm portions in the vicinity of both output terminals are of different constituency and have different temperature coefficients of resistance than have the remaining portions of the bridge arms.

The strain gage assembly illustrated in FIG. 1 comprises a stainless steel or like base member M which is rigidly anchored at one end as diagrammatically indicated at H, and is subject to flexure at the other end as indicated by the arrow designated F. As will be understood, flexure of the base member M in the manner indicated results in a directional stress S occurring in the surface 10 of the base member M, which stress S is either tensional or compressional depending upon the direction of flexure at F.

An insulative substrate film I of a suitable insulating material such as silicon monoxide is formed as by evaporative deposition in bonded relation to the surface 10 of the base member M. In the showing of FIG. 1, the thickness of the substrate I has been exaggerated for clarity. The actual thickness thereof need be only sufficient to provide good electrical insulation between the surface 10 and the bridge, e.g. about 80–100 microinches. In the situation where the base member M is composed of a nonelectroconductive material, such as glass or quartz, it is of itself insulative and the insulative substrate I can be dispensed with if desired.

The respective resistance elements or "arms" of the four-arm bridge pattern shown at FIG. 1 are designated for reference purposes as R1, R2, R3, R4. Arms R3 and R4, and also respective portions 12 and 14 of the arms R1 and R2, together with the outwardly extending corner portions or "ears" 16, 18, 20, are preferably formed by a single evaporative deposition of an electroconductive material having substantial resistance, such as $$Cr(60\%) - Si(40\%)$$

alloy of appropriate thickness, such as about 200–500 Angstroms. As above indicated, a suitable single step electrodeposition technique for fabricating this film pattern is disclosed in my aforesaid copending application 307,473.

To complete the bridge arms R1, R2, and to provide a means for placement of the output terminal common thereto in a manner minimizing thermal zero shift according to the present invention, relatively small arm segments (which collectively are also termable a compensating body or simply a "patch" 22) are formed in bonded relation on substrate I, as by vacuum electrodeposition, to overtie and electrically link the respective ends 24, 26 of arm segments 12, 14. Characteristic of the invention, the compensating patch 22 is composed of an electroconductive material of a form and constituency to have a considerably different thermal coefficient of resistance than does the remainder of the bridge, i.e. arms R3, R4, and R1 arm segment 12, and R2 arm segment 14. Where the main portions of the bridge are Cr(60%)—Si(40%) alloy of a thickness of about 200–500 Angstroms, the patch 22 suitably can be composed of chromium (Cr) of about 200–500 Angstroms thickness, in which case the patch 22 will have a substantially higher temperature coefficient of resistance and a lower resistance than the remaining portions of the bridge have.

To provide three of the bridge terminals, the outwardly extending ears 16, 18, 20 have formed thereon respective connection terminals 28, 30, 32 of a relatively highly electroconductive material such as indium, suitably bonded on the bridge film, as by thermocompression.

In the bridge circuit shown at FIG. 1, terminals 28, 30 are the input terminals, connected by respective conductors 34, 36 to a D.C. power source such as battery P. Terminal 32 between arms R3, R4 serves as one of the output terminals, being connected by conductor 38 to a suitable potential difference indicator such as voltmeter V, and the other output terminal is placed at a determined location on patch 22, and connected by conductor 40 to the other side of the potential difference indicating voltmeter V. Optimum practice of the present invention involves particular location of this output terminal at a point so that the thermal zero shift in the output voltage at V is minimized, and the terminal can be placed at any point on patch 22 which produces this result. For purposes of illustration, incident to the following discussion of various of the considerations involved, three of the many possible output terminal positions on patch 22 are indicated in FIGS. 1 and 2 at A, B, C, the position A being geometrically midway between arm R1 portion 12 and arm R2 portion 14, the position B being closer to portion 12 than to portion 14, and the position C being closer to portion 14 than to portion 12. In FIG. 1, simply for purposes of illustration of a particular case, the output terminal 42 on the patch 22, and to which output conductor 40 is connected, is shown as being coincident with said position A.

As will be recognized, the bridge arms R3 and R4 electrically consist of the respective film portions between terminals 28, 32 and between terminals 30, 32, and are composed of simultaneously deposited material of like constituency throughout, so have essentially equal temperature coefficients of resistance. On the other hand, the bridge arm R1 electrically consists of the non-overlap portion of segment 12, and the portion of patch 22 between it and terminal 42 (the overlapped end 24 being of no consequence electrically because of the lower resistance of the chromium overlay in the example selected). Similarly bridge arm R2 electrically consists of the non-overlapped portion of segment 14, and the portion of patch 22 between it and terminal 42.

As long as patch 22 is large enough between the non-overlapped portions of arm portions 12, 14 to permit the desired placement of terminal 42 in the location which accomplishes thermal zero shift compensation, the size or edge contour of the patch 22 is of no consequence. In this respect, a rectangular patch configuration is shown in FIGS. 1 and 2 simply by way of example, and any other desired form, such as circular, oval, or L-shaped, will serve in like manner.

With the bridge circuit connections and bridge pattern shown in FIGS. 1 and 2, the resistances of the respective bridge arms R1, R2, R3, R4 can be designated $R_1$, $R_2$, $R_3$, $R_4$. For simplicity, in the following analytical treatment $R_3$ is assumed to equal $R_4$ and the temperature coefficients of resistance of arms R3 and R4 are assumed to be the same. Accordingly, the temperature coefficients of resistance (° C.) of the various arms and the film 22 are designated as:

Average for R1 $= \alpha_1$
Average for R2 $= \alpha_2$
Arm R3 and arm R4 $= \alpha_3$
Compensating film $= \alpha_c$ If the output terminal 42 is to be shifted from an initial test point A to a desired connection point X where the thermal zero shift is minimal, for example, the resistance of arm R1 will become $R_1 - r$ and the resistance of arm R2 will become $R_2 + r$, where $r$ is the resistance of the portion of compensating film 22 between point A and point X. With such shift from A to X, the resulting change of bridge output voltage $E_o$ at voltmeter V can be designated as $\Delta E_r$ volts, or $\Delta E_r/E$ volts per volt, where the voltage input across terminals 16, 18 from power source P is E volts. With the output terminal 42 situated at A, the thermal zero shift is designatable as $\Delta E_A/E$ volts per volt per ° C., and with the output terminal situated at X, the thermal zero shift is designatable as $\Delta E_X/E$ volts per volt per ° C.

To predetermine proper location of the terminal 42 at point X on the patch 22, a relationship is to be established between the quantities $$\frac{\Delta E_r}{E} \text{ and } \frac{\Delta E_X}{E} - \frac{\Delta E_A}{E}$$

$$\left. \begin{array}{l} \text{Output at } A = \dfrac{R_1}{R_1 + R_2} E - \dfrac{R_4}{R_3 + R_4} E \\[6pt] \text{Output at } X = \dfrac{R_1 - r}{R_1 + R_2} E - \dfrac{R_4}{R_3 + R_4} E \end{array} \right\} \dfrac{\Delta E_r}{E} = \dfrac{r}{R_1 + R_2}$$

The thermal zero shift at point X differs from the thermal zero shift at A by the amount of the change with temperature of the voltage across $r$, therefor:

$$\text{Diff.} = \frac{\Delta E_X}{E} - \frac{\Delta E_A}{E} = \frac{r + \alpha_c r}{R_1 + \alpha_1 R_1 + R_2 + \alpha_2 R_2} - \frac{r}{R_1 + R_2}$$

$$\frac{\text{Diff.}}{\frac{\Delta E_r}{E}} = r\left[\frac{1+\alpha_c}{R_1+\alpha_1 R_1+R_2+\alpha_2 R_2} - \frac{1}{R_1+R_2}\right]\frac{R_1+R_2}{r}$$

$$= \frac{(R_1+R_2)(1+\alpha_c)}{R_1+\alpha_1 R_1+R_2+\alpha_2 R_2} - 1$$

$$= \frac{\alpha_c - \frac{R_1}{R_1+R_2}\alpha_1 - \frac{R_2}{R_1+R_2}\alpha_2}{1+\frac{R_1}{R_1+R_2}\alpha_1+\frac{R_2}{R_1+R_2}\alpha_2}$$

$$\approx \alpha_c - \frac{R_1}{R_1+R_2}\alpha_1 - \frac{R_2}{R_1+R_2}\alpha_2$$

If the bridge has nominally equal arms this is approximately $$\alpha_c - \frac{\alpha_1}{2} - \frac{\alpha_2}{2}$$

In the case where: $\alpha_1 \approx \alpha_2$ and $\alpha_c \gg \alpha_1$:
Then $$\frac{\frac{\Delta E_X}{E} - \frac{\Delta E_A}{E}}{\frac{\Delta E_r}{E}} = \alpha_c \quad (1)$$

Assuming $\alpha_c$ is known and $\Delta E_A/E$ has been determined by test, the above Equation 1 provides a convenient "yardstick" by which the location of the output terminal 42 on the compensating patch 22 can be optimized. The technique involved in thus applying this formula is set forth below.

From Equation 1 it will also be observed that the larger the value of the temperature coefficient of resistance of the compensating film 22 ($\alpha_c$), as compared with the temperature coefficient of resistance of the remainder of the bridge, the larger the thermal zero shift that can be corrected without excessive disturbance of the bridge balance.

To illustrate a typical application of Equation 1 for optimized location of output terminal 42 on the compensating patch 22, it will first be assumed that a standardized bridge fabricating procedure has been established so that the dimensions (i.e. outline and thickness) of the basic bridge pattern (i.e. R3, R4, the portion 12 of R1, and the portion 14 of R2) and the compensating film 22 are reproduced from unit to unit and that the respective temperature coefficients of resistance of these films have been determined by prior test. Then, a given production unit is selected for test to determine the optimized location of output terminal 42. An arbitrarily chosen point is selected for the output terminal 42 on the compensating patch 22, usually the center position A thereof. The bridge, with input leads 34, 36 and output leads 38, 40 connected as shown in FIG. 1, is then placed in an oven and cycled through the desired operating temperature to determine the bridge output voltage ($E_o$) at room temperature and the thermal shift ($\Delta E_A/E$) with terminal 42 at position A. With the temperature coefficient of resistance $\alpha_c$ known, and with the thermal zero shift with terminal 42 at position A known ($\Delta E_A/E$), Equation 1 indicates the extent of change of the bridge output voltage necessary to make the thermal shift at the desired point X zero, or essentially so. For example, if the test indicates that the thermal shift $E_A/E = 2.0$ microvolts per volt per ° C., and $\alpha_c$ has been determined to be .001 per ° C., then Equation 1 indicates that if the bridge output voltage $E_o$ is changed by 2000 microvolts per volt, the thermal shift at the new point of connection (X) of terminal 42 will be essentially zero. Accordingly, with the bridge output voltage $E_o$ at room temperature having been determined during the heat cycle testing, this output voltage $E_o$ is changed by experimental repositioning of the terminal 42 on the patch 22 to the position X, which desired position is signified by the output voltage reading at voltmeter V differing from $E_o$ by 2000 microvolts per volt. The terminal 42 is then permanently attached at the experimentally determined position X. At such new position, the thermal shift of the bridge output can be presumed to be essentially zero without a further temperature recycling or test.

As has been indicated, it is an advantage of the present invention that thermal shift effects can be minimized without significant loss of bridge balance. This is particularly true where, as in the selected embodiment, the electroconductivity of the patch 22 is considerably greater than the electroconductivity of the remainder of the bridge. However, should it turn out that the repositioning of output terminal 42 at position X shifts the bridge balance an adverse extent, the bridge balance can be readily corrected by techniques known per se, such as by selective edge electroetching or abrasion of the higher resistance film making up the bridge arms. Such bridge balancing techniques are for example disclosed in my aforesaid copending application Serial No. 307,473. Any such balancing of the bridge after thermal zero shift compensation thereof is of no material effect upon the thermal shift compensation in that the slight change in resistance value of an arm for average balancing has no material effect on its temperature coefficient of resistance.

Another test of a bridge such as shown in FIG. 1 was made in the following manner. Test conductors were attached to the patch 22 at the three points designated A, B, C, the bridge was placed in an oven, and these three leads along with the other output lead 38 and the input leads 34, 36 were brought out and connected as shown in FIG. 1. The oven temperature was first cycled with the terminal at position B in circuit, then with the terminal at position A in circuit, and finally with the terminal at position C in circuit. With a two-volt input across leads 34, 36, the bridge output voltage was recorded as a function of temperature on a Speedomax recorder over the temperature range of from 65° F. to 250° F. With the compensation connection at B, the output voltage shifted +.70 microvolt per ° F. with rising temperature. With the connection at position A in circuit, the output shifted −.75 microvolt per ° F. with rising temperature. With the compensating connection at position C in circuit, the output shifted −2.7 microvolts per ° F. with rising temperature. Since the thermal zero shift is of opposite sign at the A connection and the B connection, it was clear that an even smaller or zero thermal shift is obtainable by placement of the connection point at a determinable location intermediate the A and B positions.

FIGS. 1 and 2, and the above analytical treatment, illustrate the compensation of thermal zero shift in a four-arm bridge by utilization of a single compensating film in the vicinity of one output terminal area. The same techniques can be also employed at the second output terminal to provide a greater flexibility as to optimizing minimal thermal zero shift and bridge balance, the total effects of terminal shift on the opposed compensating films being algebraically additive. Such a form of four-arm bridge with two opposed compensating patches is shown at FIG. 3, wherein the bridge arrangement is identical to that shown in FIG. 1 except that the bridge arms R3′, R4′ are composed of respective separate segments 44, 46 joined by a second compensating film patch 22′ presenting a selection of placements for the output terminal 32′ to which output conductor 38 connects, three such placement positions being shown by way of example at A′, B′, C′, with the selected position of terminal 32′ being coincident with the position A′.

A further test was made with two specimens of a bridge pattern of the type presented at FIG. 3, wherein leads were brought off the bridge assembly from the three positions A, B, C, on compensating patch 22 and from the three positions A', B', C' on the compensating tab 22'. This test was performed with a hot plate as the heat source. Measured shifts between room temperature (70° F.) and hot plate temperature (about 225° F.) are tabulated below in millivolts per volt.

| Connection | Bridge 1 | Bridge 2 |
|---|---|---|
| CB' | −.207 | −.380 |
| AB' | −.150 | −.207 |
| CA' | −.170 | −.190 |
| BB' | −.033 | −.107 |
| AA' | 0 | −.066 |
| CC' | +.010 | −.027 |
| BA' | +.107 | +.076 |
| AC' | +.127 | +.107 |
| BC' | +.297 | +.250 |

In the above table the connections are so grouped that the first set represents two units of negative compensation, the second set one negative unit, the third set no unit of compensation, the fourth set one unit of positive compensation, and the fifth set two units of positive compensation.

From the foregoing, various further modifications, adaptations, applications, and component arrangements and configurations will be apparent to those skilled in the art to which the invention is addressed. Thus, by way of further non-limitive example, the thermal zero shift compensating film in the vicinity of a connection terminal of the bridge can be utilized in connection with a two-arm type bridge as well as a four-arm bridge, since a two-arm bridge involves use of passive resistance elements for the strain sensitive resistance arms R3, R4 in the circuit arrangement shown in FIG. 1. Also, the base member M can be of any appropriate electrically conductive or non-conductive material, and can be in any desired form other than a cantilevered bar, such as a flat or curved diaphragm or sleeve, simply by way of further example. Further, while the bridge pattern has been described as being formed by vacuum electrodeposition, with the compensating film formed last, it will be recognized that the order in which the films are formed can readily be reversed. Additionally, it is to be recognized the thermal zero shift compensating tab can have a substantially lower temperature coefficient of resistance, rather than higher, as compared with the temperature coefficient of resistance of the remainder of the bridge, the important consideration in this respect being that the respective temperature coefficients of resistance be substantially different so that shift of the terminal connection position realizes a substantial range of "averaging" insofar as concerns changing the average temperature coefficient of resistance of one bridge arm with respect to the average temperature coefficient of resistance of the adjacent bridge arm. As will also be apparent, the thermal zero shift compensating film segments provided by the present invention can be utilized to provide shifting of the connection positions of one or both of the input terminals of a bridge, in lieu of or in conjunction with compensating film segments at one or more of the output terminals.

What is claimed is:

1. A full bridge strain gage, comprising an insulating base member, and a strain sensitive electroconductive film in bonded relation to said base member, said film comprising a plurality of strain sensitive resistance arms forming a bridge pattern, each of said arms being connected at one end to one of a substantially opposed pair of input connection terminals and connected at the other end to one of a substantially opposed pair of output connection terminals, with a terminal receiving portion of two adjacent resistance arms being composed of a single deposited film of electroconductive material having a substantially different temperature coefficient of resistance than that of the electroconductive film making up the remaining portions of the resistance arms, the connection terminal on said single deposited film being situated to minimize thermal shift of the output voltage appearing across said output connection terminals.

2. A full bridge strain gage, comprising an insulating base member, and a strain sensitive electroconductive film in bonded relation to said base member, said film comprising a plurality of strain sensitive resistance arms forming a bridge pattern, each of said arms being connected at one end to one of a substantially opposed pair of input connection terminals and connected at the other end to one of a substantially opposed pair of output connection terminals, with a terminal receiving portion and the terminal surrounding portion of at least one adjacent pair of said resistance arms being formed of an electroconductive material having a substantially dissimilar temperature coefficient of resistance than that of the electroconductive material making up the rest of the adjacent pairs of resistance arms, the connection terminal thereon being situated to minimize thermal shift of the output voltage appearing across said output connection terminals.

3. A full bridge strain gage, comprising an insulating base member, and a strain sensitive electroconductive film in bonded relation to said base member, said film comprising a plurality of strain sensitive resistance arms forming a four-arm bridge pattern, with each end of each arm being composed of deposited electroconductive film and sharing a terminal with the end of the adjacent arm, the adjacent arms being arranged in respectively different attitudes with respect to the direction of stress applied to said base member, a voltage source connected to one opposed pair of terminals, and means sensing the output voltage at the other opposed pair of terminals, one portion of each of the pair of adjacent arms in the vicinity of the common terminal thereof being composed of an electroconductive material having a substantially different temperature coefficient of resistance than has the electoconductive material making up the remainder of the said adjacent bridge arms, such common terminal being placed at a point providing minimal variation in bridge output with variation in temperature.

4. A full bridge strain gage according to claim 3, wherein such first-mentioned electroconductive material has a temperature coefficient of resistance which is considerably higher than that of such first-mentioned electroconductive material.

5. A full bridge strain gage according to claim 4, wherein said second-mentioned electroconductive material is a chromium and silicon containing alloy, and said second-mentioned electroconductive material is chromium.

6. The method of fabrication of a thermal zero shift compensated bridge on a flexural base member comprising:
   (a) depositing a film of strain sensitive electroconductive material having a given temperature coefficient of resistance in a pattern to provide a plural arm bridge pattern except for certain terminal receiving portions of the pattern;
   (b) depositing a film of another electroconductive material having a substantial different temperature cofficient of resistance in a pattern to complete the plural arm bridge pattern;
   (c) permanently affixing terminal means at the between-arm locations on the first above-mentioned film;
   (d) temporarily locating terminal means on the second above-mentioned film;
   (e) connecting said terminal means in a Wheatstone bridge circuit;

(f) cycling the bridge through its intended range of operating temperature to determine the average value of the bridge output and the extent of thermal shift thereof; and (g) relocating the second above-mentioned terminal means to a point on the second above-mentioned film where the thermal shift of the bridge output is minimized.

7. The method of claim 6, comprising relocating the second above-mentioned terminal means to minimize the thermal shift of the bridge output by placing the terminal means at a location which changes the bridge output substantially an amount determined by the following relationship:

$$\frac{\frac{\Delta E_x}{E} - \frac{\Delta E_A}{E}}{\frac{\Delta E_r}{E}} = \alpha_c$$

where $\alpha_c$ is the temperature coefficient of resistance per ° C. of the second above-mentioned film, where $\Delta E_A/E$ is the thermal shift in volts per volt per ° C. of the bridge output with the said second above-mentioned terminal means at the temporary location thereof, where $\Delta E_x/E$ is the thermal shift in volts per volt per ° C. of the bridge output with the second above-mentioned terminal means at the relocated position thereof, and where $\Delta E_r/E$ is the change in volts per volt per ° C. of the bridge output voltage incident to the relocation of the second above-mentioned terminal means.

8. The method of claim 6, wherein said second above-mentioned film has a temperature coefficient of resistance which is considerably higher than that of the said first above-mentioned film.

9. The method of claim 8, wherein said first above-mentioned film is a semiconductor and said second above-mentioned film is a conductor.

10. The method of claim 9, wherein said first above-mentioned film is a chromium and silicon containing alloy, and said second above-mentioned film is chromium.

References Cited by the Examiner

UNITED STATES PATENTS

| | | | |
|---|---|---|---|
| 2,621,276 | 12/1952 | Howland | 73—88.5 X |
| 3,034,347 | 5/1962 | Starr | 73—88.5 X |

OTHER REFERENCES

"High Temperature Strain Gages," N.B.S. Technical News Bulletin, July 1958, pages 134–137.

RICHARD C. QUEISSER, *Primary Examiner.*

C. A. RUEHL, *Assistant Examiner.*